UNITED STATES PATENT OFFICE.

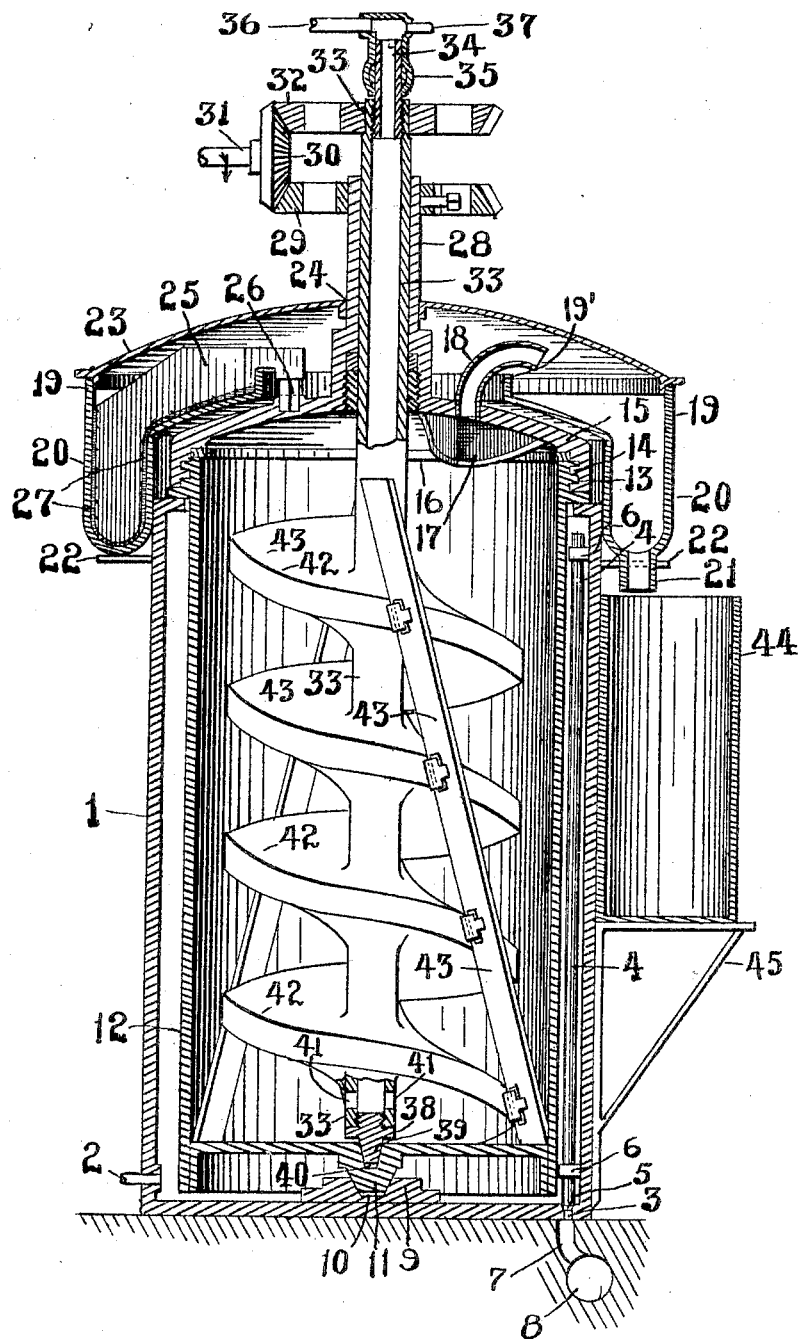

JOHN J. GLAUSER, OF PITTSBURG, PENNSYLVANIA, ASSIGNOR TO THE EDWARD E. RIECK COMPANY, OF PITTSBURG, PENNSYLVANIA, A CORPORATION OF PENNSYLVANIA.

APPARATUS FOR THE MANUFACTURE OF FROZEN LIQUIDS.

No. 797,512.   Specification of Letters Patent.   Patented Aug. 15, 1905.

Application filed November 10, 1904. Serial No. 232,065.

*To all whom it may concern:*

Be it known that I, JOHN J. GLAUSER, a citizen of the United States, residing at Pittsburg, in the county of Allegheny and State of Pennsylvania, have invented or discovered new and useful Improvements in Apparatus for the Manufacture of Frozen Liquids, of which the following is a specification.

The accompanying drawing is a vertical section and showing the conveyer and paddles in side elevation.

The object of my invention, generally stated, is to provide means whereby cream, commercially known as "ice-cream," is expeditiously converted from the raw mixture into a semifrozen state and preferably discharged into storage-receptacles, which receptacles are subsequently subjected to a freezing, which solidifies the cream contained therein.

A further object is to provide means for supplying liquid cream preferably continuously to the agitating-receptacle. I also provide means for supplying air preferably continuously to the agitating-receptacle and below the top of the mixture contained in the receptacle, which air is intended to be for aerating the mixture and making the cream fluffy. I also provide conveying means within the receptacle, which means aid the mixture when partly solidified to pass out of the exit from said receptacle.

Other objects of my invention will be noted from the detailed description which follows.

1 represents a stationary tank having an inlet 2 for a cooling fluid, and an outlet 3, which is substantially a valve-seat. 4 represents a vertical pipe within said tank, having its lower extremity shaped to conform with the seat 5 of the opening 3, by which when the pipe is in a position as shown in the drawing liquid is prevented from leaking out of said opening. 6 represents brackets for supporting said pipe and holding it in alinement with said opening. 7 represents a pipe communicating with said opening and the conduit 8. 9 represents the flange within the said tank and connected therewith and having a depression 10, which acts as a bearing for the lug 11 of the agitating-tank 12. Said tank is provided with a screw-thread 13 on its upper extremity, and said thread is engaged by the threads 14 of the cap 15. A gasket 16 prevents a leakage from the tank at the union of the lid and tank.

17 is a scoop-shaped receptacle secured to the lid 15 and which acts as a conductor in conveying the partly-solidified cream to the outlet-pipe 18, which pipe is also secured to said lid.

19 represents an annular receptacle located partly above the lid, having an opening 19′ and a downwardly-depending portion 20 and an outlet 21. Said receptacle is supported on projections 22 of the tank 1. 23 represents the lid for said receptacle, having an orifice 24.

25 is a wiper secured at 26 rigidly to the lid 15.

27 represents, preferably, a flexible edging of material such as rubber and is secured by any well-known means to that portion of the wiper 25 which is in contact with the receptacle.

28 represents a hollow spindle secured to the lid 15 at its lower extremity and having a beveled gear 29 secured to its upper extremity, said gear meshing with beveled gear 30, which gear is mounted on the driving-shaft 31, which derives its power from a source not shown.

32 represents a beveled gear secured to the hollow stem 33, which stem has also secured to it a pipe 34. A friction-coupling 35 is loosely secured to said pipe and has, preferably, an inlet 36 for the liquid mixture and an inlet 37 for compressed air. At the lower extremity of stem 33 is a plug 38, having a tapered projection 39, which engages in an opening 40 in the lug 11.

41 41 represent outlet-ports, and 42 42 represent a worm conveyer surrounding the hollow stem 33 and preferably integral therewith.

43 43 represent agitators secured to the periphery of the conveyers and in preferably angular alinement, as shown in the drawing.

44 represents a portable storage-receptacle supported on a bracket 45.

In the operation of my invention, assuming that a cooling fluid is passing into the tank 1 through pipe 2 and filling said tank up to and passing out of the upper end of pipe 4; that a raw mixture in a fluid condition under pressure is flowing through pipes 36 34, hollow stem 33, and passing out through ports 41 into the interior of tank 12 until said tank is filled within a short distance above the lower portion of scoop 17, the shaft 31 is now rotated in the direction of the arrow adjacent thereto, which revolves beveled gear 30 in a like direction, which causes beveled gear 29 to revolve toward the left in the drawing, which gear 29 is secured to the hollow spindle 28, and it in turn through the lid 15 revolves the agitating-tank 12 upon its axis 11 in a like direction. The revolving of the tank 12 carries the wiper 25, pipe 18, and scoop 17 around with it. Beveled gear 32 would revolve toward the right in the drawing, rotating the hollow stem 33 in a like direction upon its axis 39, carrying therewith the agitator 43. The raw mixture and preferably air under pressure from pipe 37 will now continue to pass into the bottom of the agitating-tank 12, forcing the partly-frozen mixture above out through pipe 18 and into receptacle 19, and as the wiper 25 revolves around within the stationary receptacle 19 it forces the partly-frozen mixture ahead of it. As the mixture passes the opening 21 it falls therethrough and into the storage-receptacle 44. When receptacle 44 is filled, it is removed, another receptacle substituted, and the filled receptacle placed in the freezing-vat. (Not shown.)

It is evident that my invention provides means for a continuous manufacture of ice-cream and other frozen products, which means are in themselves novel. My mechanism is peculiarly simple, and therefore capable of very inexpensive construction. Many changes from the arrangement shown will of course suggest themselves to those skilled in the art, which, however, are within the scope of the invention. I therefore do not desire to limit myself to the exact construction shown in the drawings; but

I claim as follows:

1. In apparatus for manufacturing frozen liquids, a freezing vessel adapted to be rotated, means for rotating said freezing vessel, an inlet-tube for the admission of the liquid extending through substantially the length of said vessel and discharging adjacent to the bottom thereof and means for discharging the product from said freezing vessel, substantially as and for the purposes set forth.

2. In apparatus for manufacturing frozen liquids, a freezing vessel adapted to be rotated, means for rotating said freezing vessel, an inlet-tube for the admission of the liquid extending through substantially the length of said vessel and discharging adjacent to the bottom thereof, means for introducing air into the liquid in said inlet-tube and means for discharging the product from said freezing vessel, substantially as and for the purposes set forth.

3. In apparatus for the manufacture of frozen liquids, a freezing vessel adapted to rotate, means for rotating said freezing vessel, an inlet-tube for the admission of liquid extending through substantially the length of said freezing vessel and discharging adjacent to the bottom thereof, a stationary vessel in communication with said rotatable vessel, means for discharging the product from said rotatable vessel into said stationary vessel and means within said stationary vessel for collecting and discharging the product therefrom, substantially as and for the purpose described.

4. In apparatus for the manufacture of frozen liquids, a freezing vessel adapted to rotate, means for rotating said freezing vessel, an inlet-tube for the admission of liquid extending substantially through the length of said freezing vessel, a stationary vessel located above said freezing vessel, a tube connecting said vessels, means for discharging the contents of said freezing vessel through said tube into said stationary vessel and means for collecting and discharging the contents of said stationary vessel, substantially as and for the purposes described.

5. In apparatus for the manufacture of frozen liquids, a freezing vessel adapted to rotate, means for rotating said freezing vessel, an inlet-tube for the admission of liquids extending substantially through the length of said freezing vessel, a stationary vessel located above and surrounding the upper portion of said freezing vessel, means for discharging the product from said freezing-chamber into said stationary chamber, and a revolving scraper within said stationary chamber whereby the contents thereof are collected and discharged therefrom, substantially as and for the purpose described.

Signed at Pittsburg this 7th day of November, 1904.

JOHN J. GLAUSER.

Witnesses:
J. H. HARRISON,
GEO. H. HARVEY.